United States Patent
Ji

(10) Patent No.: US 11,146,424 B2
(45) Date of Patent: Oct. 12, 2021

(54) METHOD AND DEVICE FOR DETERMINING DETECTION INFORMATION ABOUT SEARCH SPACES

(71) Applicant: VIVO MOBILE COMMUNICATION CO., LTD., Guangdong (CN)

(72) Inventor: Zichao Ji, Chang'an Dongguan (CN)

(73) Assignee: VIVO MOBILE COMMUNICATION CO., LTD., Chang'an Dongguan (CN)

( * ) Notice: Subject to any disclaimer, the term of this patent is extended or adjusted under 35 U.S.C. 154(b) by 0 days.

(21) Appl. No.: 16/967,120

(22) PCT Filed: Feb. 1, 2019

(86) PCT No.: PCT/CN2019/074408
§ 371 (c)(1),
(2) Date: Aug. 3, 2020

(87) PCT Pub. No.: WO2019/154320
PCT Pub. Date: Aug. 15, 2019

(65) Prior Publication Data
US 2020/0366533 A1 Nov. 19, 2020

(30) Foreign Application Priority Data
Feb. 11, 2018 (CN) .......................... 201810142644.2

(51) Int. Cl.
*H04L 25/02* (2006.01)
*H04L 5/00* (2006.01)
(Continued)

(52) U.S. Cl.
CPC ........ *H04L 25/0238* (2013.01); *H04L 5/0058* (2013.01); *H04W 72/042* (2013.01); *H04W 72/10* (2013.01)

(58) Field of Classification Search
None
See application file for complete search history.

(56) References Cited

U.S. PATENT DOCUMENTS

| | | | |
|---|---|---|---|
| 2013/0016672 A1* | 1/2013 | Yang | H04L 5/0053 370/329 |
| 2013/0044664 A1* | 2/2013 | Nory | H04L 1/0045 370/311 |

(Continued)

FOREIGN PATENT DOCUMENTS

| | | |
|---|---|---|
| CN | 101699901 A | 4/2010 |
| CN | 102291736 A | 12/2011 |

(Continued)

OTHER PUBLICATIONS

CN Office Action in Application No. 201810142644.2 dated May 27, 2020.
(Continued)

*Primary Examiner* — Ernest G Tacsik
(74) *Attorney, Agent, or Firm* — Maschoff Brennan

(57) ABSTRACT

The present disclosure provides a device and a method for determining detection information about search spaces, and relates to the field of communications technology. The method for determining detection information about search spaces includes, in a case that at least two search spaces are being detected by a UE and a sum of initial quantities of pieces of detection information about the at least two search spaces is greater than a total quantity of pieces of detection information supported by the UE, determining a first quantity of pieces of detection information about each of the at least two search spaces. A sum of the first quantities of pieces of detection information about the at least two search spaces is smaller than or equal to the total quantity of pieces of detection information. The detection information includes a PDCCH candidate or PDCCH channel estimate.

14 Claims, 2 Drawing Sheets

(51) Int. Cl.
*H04W 72/04* (2009.01)
*H04W 72/10* (2009.01)

(56) References Cited

U.S. PATENT DOCUMENTS

| | | | | |
|---|---|---|---|---|
| 2013/0114563 A1* | 5/2013 | Oizumi | .................... | H04L 5/001 |
| | | | | 370/329 |
| 2013/0155868 A1* | 6/2013 | Seo | .................... | H03M 13/6525 |
| | | | | 370/241 |
| 2013/0183987 A1* | 7/2013 | Vrzic | .................... | H04L 1/0046 |
| | | | | 455/450 |
| 2013/0195068 A1* | 8/2013 | Baker | .................... | H04L 5/0051 |
| | | | | 370/330 |
| 2014/0161082 A1 | 6/2014 | Geo et al. | | |
| 2014/0177582 A1 | 6/2014 | Wu et al. | | |
| 2014/0185508 A1* | 7/2014 | Suda | ................. | H04W 52/0225 |
| | | | | 370/311 |
| 2015/0296542 A1 | 10/2015 | Heo et al. | | |
| 2016/0021658 A1* | 1/2016 | Chen | .................... | H04L 5/0053 |
| | | | | 370/252 |
| 2017/0127391 A1* | 5/2017 | Wang | .................... | H04L 5/0032 |
| 2017/0332359 A1 | 11/2017 | Tsai et al. | | |
| 2017/0374569 A1* | 12/2017 | Lee | ........................ | H04L 1/0038 |
| 2019/0110279 A1* | 4/2019 | Behravan | ............... | H04L 5/0053 |
| 2019/0150073 A1* | 5/2019 | Tiirola | .................... | H04W 72/10 |
| | | | | 455/434 |
| 2020/0163062 A1* | 5/2020 | Takeda | ................... | H04L 5/0053 |
| 2020/0213837 A1* | 7/2020 | Pan | .................... | H04W 72/0446 |
| 2021/0099979 A1* | 4/2021 | Takeda | ................. | H04W 72/042 |

FOREIGN PATENT DOCUMENTS

| | | |
|---|---|---|
| CN | 103748928 A | 4/2014 |
| EP | 3 740 012 A1 | 11/2020 |
| WO | 2016/169047 A1 | 10/2016 |
| WO | 2017/180039 A1 | 10/2017 |

OTHER PUBLICATIONS

"On reducing the PDCCH channel estimation and BD complexity in NR" 3GPP TSG RAN WG1 Ad Hoc 1801, Jan. 22, 2018.
Extended European Search Report issued in corresponding application No. 19751737.8, dated Feb. 25, 2021.

\* cited by examiner

METHOD AND DEVICE FOR DETERMINING DETECTION INFORMATION ABOUT SEARCH SPACES

CROSS-REFERENCE TO RELATED APPLICATION

The present application is the U.S. national phase of PCT Application No.PCT/CN2019/074408 filed on Feb. 1, 2019, which claims a priority of the Chinese patent application No.201810142644.2 filed in China on Feb. 11, 2018, the disclosures of which are incorporated herein by reference in their entireties.

TECHNICAL FIELD

The present disclosure relates to the field of communications technology, in particular to a method and a device for determining detection information about search spaces.

BACKGROUND

In a long term evolution (Long Term Evolution, LTE) system, a user equipment (User Equipment, UE, also called terminal) merely detects one physical downlink control channel (Physical Downlink Control Channel, PDCCH). Within the PDCCH, the UE detects PDCCH candidates in a fixed search space in a blind manner, and a total quantity of the PDCCH candidates to be detected in a blind manner is fixed.

A $5^{th}$-Generation (5G) New Radio (NR) system supports to configure a plurality of control resource sets (Control Resource Sets, CORESETs) and a plurality of search spaces for the UE, and flexibly configure a quantity of blind detection operations for each search space. The CORESETs may be flexibly associated with the search spaces. In addition, in order to reduce the implementation complexity of the UE, a maximum quantity of blind detection operations and a maximum quantity of channel estimates for the UE in unit time have been speculated in the NR system, i.e., a sum of the quantities of blind detection operations for all the search spaces shall not exceed the maximum quantity of blind detection operations and a sum of the quantities of channel estimates shall not exceed the maximum quantity of channel estimates.

Each search space has an independent detection periodicity, and in a case that the quantity of blind detection operations or the quantity of channel estimates is allocated on all configured CORESETs in accordance with the maximum quantity of blind detection operations or the maximum quantity of channel estimates supported by the UE, at some time points, the system may merely use the quantity of blind detection operations or the quantity of channel estimates that is far less than that supported by the UE. Taking the quantity of blind detection operations as an example, the maximum quantity of blind detection operations supported by the UE is 44, and two search spaces SS-1 and SS-2 are allocated. The search space SS-1 has a periodicity of 2 slots, and the search space SS-2 has a periodicity of 4 slots. In a case that the quantity of blind detection operations allocated for SS-1 is 24 and the quantity of blind detection operations allocated for SS-2 is 20, SS-1 and SS-2 are detected by the UE simultaneously at slots 0, 4, 8, . . . , and the total quantity of blind detection operations does not exceed the supported maximum quantity of blind detection operations (i.e., 44). However, merely SS-1 is detected by the UE at slots 2, 6, 10, . . . , and the total quantity of blind detection operations is 24.

It can be seen that, in this allocation mode, it is impossible to make full use of the UE capability, so a control resource utilization rate of the system decreases remarkably and a probability of the blocking of control channel allocation increases.

SUMMARY

An object of the present disclosure is to provide a method and a device for determining detection information about search spaces, so as to solve the problem in the related art where it is impossible to make full use of the UE capability using the allocation mode of the quantity of blind detection operations or the quantity of channel estimates, and thereby the control resource utilization rate of the system decreases remarkably and the probability of the blocking of control channel allocation increases.

To solve the above problem, the following schemes are provided in the present disclosure.

In one aspect, the present disclosure provides in an embodiment a method for determining detection information about search spaces, including, in a case that at least two search spaces are being detected by a UE and a sum of initial quantities of pieces of detection information about the at least two search spaces is greater than a total quantity of pieces of detection information supported by the UE, determining a first quantity of pieces of detection information about each of the at least two search spaces. A sum of the first quantities of pieces of detection information about the at least two search spaces is smaller than or equal to the total quantity of pieces of detection information. The detection information includes a PDCCH candidate or PDCCH channel estimate.

In another aspect, the present disclosure provides in an embodiment a device for determining detection information about search spaces, including a determination module used to, in the case that at least two search spaces are being detected by a UE and a sum of initial quantities of pieces of detection information about the at least two search spaces is greater than a total quantity of pieces of detection information supported by the UE, determine a first quantity of pieces of detection information about each of the at least two search spaces. A sum of the first quantities of pieces of detection information about the at least two search spaces is smaller than or equal to the total quantity of pieces of detection information. The detection information includes a PDCCH candidate or PDCCH channel estimate.

In yet another aspect, the present disclosure provides in an embodiment a device for determining detection information about search spaces, including a memory, a processor, and a computer program stored in the memory and capable of being executed by a processor. The processor is used to execute the computer program to implement the above-mentioned method for determining detection information about search spaces.

In still yet another aspect, the present disclosure provides in an embodiment a computer-readable storage medium storing therein a computer program. The computer program is capable of being executed by the processor to implement the above-mentioned method for determining detection information about search spaces.

The present disclosure has the following beneficial effects. According to the embodiments of the present disclosure, in the case that at least two search spaces are being detected by the UE and the sum of the initial quantities of pieces of detection information about the at least two search spaces is greater than the total quantity of pieces of detection information supported by the UE, the first quantity of pieces of detection information about each of the at least two search spaces may be determined, and the sum of the first quantities of pieces of detection information about the at least two search spaces may be ensured to be smaller than or equal to the total quantity of pieces of detection information. As a result, it is able to improve a control resource utilization rate of a system and reduce a probability of the blocking of control channel allocation, thereby to ensure the reliability of network communication.

DETAILED DESCRIPTION

In order to make the objects, the technical solutions and the advantages of the present disclosure more apparent, the present disclosure will be described hereinafter in details in conjunction with the drawings and embodiments.

An object of the present disclosure is to provide a method and a device for determining detection information about search spaces, so as to solve the problem in the related art where it is impossible to make full use of the UE capability using the allocation mode of the quantity of blind detection operations or the quantity of channel estimates, and thereby the control resource utilization rate of the system decreases remarkably and the probability of the blocking of control channel allocation increases.

Figure 1:
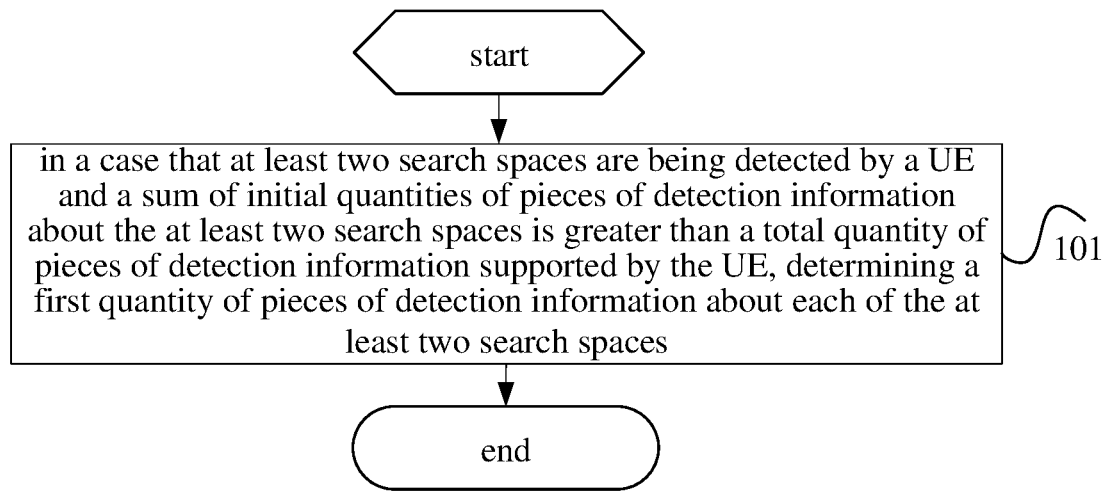
FIG. 1 is a flow chart of a method for determining detection information about search spaces according to an embodiment of the present disclosure.

As shown in FIG. 1, which is a flow chart of a method for determining detecting information about search spaces according to an embodiment of the present disclosure, the method includes Step 101 of, in a case that at least two search spaces are being detected by a UE and a sum of initial quantities of pieces of detection information about the at least two search spaces is greater than a total quantity of pieces of detection information supported by the UE, determining a first quantity of pieces of detection information about each of the at least two search spaces. A sum of the first quantities of pieces of detection information about the at least two search spaces is smaller than or equal to the total quantity of pieces of detection information.

It should be appreciated that, the at least two search spaces may refer to search spaces being detected by the UE simultaneously in any unit time.

To be specific, the total quantity of pieces of detection information may be a maximum quantity of pieces of detection information supported by the UE. A network may configure one or more search spaces for the UE and configure an initial quantity of pieces of detection information about each search space, and the initial quantity of pieces of detection information may not exceed the maximum quantity of pieces of detection information supported by the UE. The detection information may include PDCCH candidates or PDCCH channel estimates. To be specific, each PDCCH candidate may refer to PDCCH blind detection. For example, the network may configure one or more search spaces for the UE and configure the initial quantity of blind detection operations for each search space, and the initial quantity of blind detection operations shall be smaller than a maximum quantity of blind detection operations supported by the UE.

In other words, in a case that the initial quantity of pieces of detection information is the initial quantity of blind detection operations, the total quantity of pieces of detection information may be the maximum quantity of blind detection operations, and in a case that the initial quantity of pieces of detection information is the initial quantity of PDCCH channel estimates, the total quantity of pieces of detection information may be the maximum quantity of PDCCH channel estimates.

It should be appreciated that, the method for determining the detection information about the search spaces may be applied to a UE or a base station.

To be specific, usually Step 101 may be implemented in at least one of the following modes.

First mode: determining a first quantity of pieces of detection information about each search space in accordance with information about a type of a priority level of the search space.

It should be appreciated that, this mode relates to the allocation of the first quantity of pieces of detection information preferentially on the basis of the type, i.e., the quantity of pieces of detection information about the search spaces of some types is ensured preferentially.

Due to different types of the search spaces (common search space or UE-specific search space, Type-0/1/2/3 . . . ), in a case that different downlink control information (Downlink Control Information, DCI) formats or sizes (DCI 0_0, DCI 1_0, DCI 2_1, etc.) are searched, priority levels of the search spaces may be ranked in accordance with the above information. In a case that different search spaces overlap each other, the quantity of pieces of detection information about a search space whose type is of a high priority level may be ensured preferentially, and the quantity of pieces of detection information whose type is of low priority level may be reduced, so as to ensure that the sum thereof does not exceed the supported total quantity of pieces of detection information.

For example, the common search space may have a priority level higher than the UE-specific search space, and some DCI formats (e.g., DCI 2_0) may have a priority level higher than the other DCI formats (e.g., DCI 2_2).

Second mode: determining the first quantity of pieces of detection information about each search space in accordance with a second quantity of pieces of detection information, the second quantity of pieces of detection information being a difference between the sum of the initial quantities of pieces of detection information about the at least two search spaces and the total quantity of pieces of detection information supported by the UE.

It should be appreciated that, the second quantity may refer to an excessive quantity of pieces of detection information. This mode may refer to the determination of the first quantity of pieces of detection information on the basis of the deduction of a weight value, i.e., the excessive quantity may be deducted from the quantity of pieces of detection information about each search space. As a specific implementation mode thereof, an allocation weight value of each search space may be determined in accordance with a predetermined configuration parameter, and the first quantity of pieces of detection information about each search space may be acquired in accordance with the second quantity of pieces of detection information which is greater than the total quantity of pieces of detection information supported by the UE as well as the allocation weight value.

To be specific, the predetermined configuration parameter may include at least one of a detection periodicity of the search space, the initial quantity of pieces of detection information, a priority level of the search space, a DCI format, a DCI length and a search space type.

Depending on different predetermined configuration parameters, modes for determining the allocation weight value of each search space may be different from each other. The determining the allocation weight value of each search space in accordance with the predetermined configuration parameter will be described hereinafter with respect to different predetermined configuration parameters.

A1: in a case that the predetermined configuration parameter includes the detection periodicity of the search space, or includes the detection periodicity of the search space and the initial quantity of pieces of detection information, the determining the allocation weight value of each search space in accordance with the predetermined configuration parameter may include: acquiring a search frequency for each search space within a predetermined time period in accordance with the predetermined configuration parameter; and acquiring the allocation weight value of each search space in accordance with the search frequency.

To be specific, the predetermined time period may refer to unit time.

Further, the acquiring the search frequency for each search space within the predetermined time period may include acquiring the search frequency for each search space within the predetermined time period through a formula $$F_i = \frac{1}{T_i},$$

where $F_i$ represents a search frequency for an $i^{th}$ search space within the predetermined time period, $T_i$ represents a detection periodicity of the $i^{th}$ search space, and $i$ represents an index of the search space.

In this case, depending on different predetermined configuration parameters, the modes of acquiring the allocation weight value of each search space in accordance with the search frequency may be different from each other too. The acquiring the allocation weight value of each search space in accordance with the search frequency will be described hereinafter with respect to different predetermined configuration parameters.

B1: in a case that the predetermined configuration parameter merely includes the detection periodicity of the search space, the acquiring the allocation weight value of each search space in accordance with the search frequency may include acquiring the allocation weight value of each search space through a formula $$P_i = \frac{F_i}{\Sigma_i F_i},$$

where $P_i$ represents an allocation weight value of the $i^{th}$ search space, $F_i$ represents the search frequency for the $i^{th}$ search space within the predetermined time period, and $\Sigma$ represents a summation function.

B2: in a case that the predetermined configuration parameter includes the detection periodicity of the search space and the initial quantity of pieces of detection information, the acquiring the allocation weight value of each search pace in accordance with the search frequency may include acquiring the allocation weight value of each search space through a formula $$P_i = \frac{B_i \times F_i}{\Sigma_i B_i \times F_i},$$

where $P_i$ represents the allocation weight value of the $i^{th}$ search space, $F_i$ represents the search frequency of the $i^{th}$ search space within the predetermined time period, and $B_i$ represents the initial quantity of pieces of detection information about the $i^{th}$ search space.

A2: in a case that the predetermined configuration parameter includes the priority level of the search space, the determining the allocation weight value of each search space in accordance with the predetermined configuration parameter may include acquiring the allocation weight value of each search space through a formula $$P_i = \frac{L_i}{\Sigma_i L_i},$$

where $P_i$ represents the allocation weight value of the $i^{th}$ search space, and $L_i$ represents a priority level of the $i^{th}$ search space.

It should be further appreciated that, the allocation weight value of each search space may be calculate through a formula $$P_i = \frac{L_i^a \times B_i^b \times F_i^c}{\Sigma_i L_i^a \times B_i^b \times F_i^c}.$$

The above situation may be considered as a special case where a, b and c in the formula are each of 0 or 1.

Through assigning each of a, b and c with different values, the scheme in the embodiments of the present disclosure may be further applied to various application scenarios.

Further, the acquiring the first quantity of pieces of detection information about each search space in accordance with the second quantity of pieces of detection information which is greater than the total quantity of pieces of detection information supported by the UE as well as the allocation weight value may include acquiring the first quantity of pieces of detection information about each search space through a formula $B'_i = \max\{C, B_i - [(\Sigma_i B_i - M) \times P_i]\}$, where $B'_i$ represents the first quantity of pieces of detection information about the $i^{th}$ search space, $B_i$ represents the initial quantity of pieces of detection information about the $i^{th}$ search space, $P_i$ represents the allocation weight value of the $i^{th}$ search space, M represents the total quantity of pieces of detection information supported by the UE, $\Sigma_i B_i - M$ represents the second quantity of pieces of detection information which is greater than the total quantity of pieces of detection information supported by the UE, $\Sigma$ represents a summation function, and C represents a first threshold.

It should be further appreciated that, in some cases, the initial quantity of pieces of detection information about a certain search space maybe smaller than the excessive configuration quantity. In the above formula, in a case that a first threshold, which is a minimum quantity of pieces of detection information about the search space, has been configured in advance, the quantity of pieces of detection information about the search space may not be smaller than the first threshold in any configuration. In this mode, it is able to ensure that the quantity of pieces of detection information actually allocated for each search space is not greater than the quantity of pieces of detection information previously allocated for the search space. Considering that the quantity of pieces of detection information is related to the quantity of resources in a CORESET associated with each search space, it is meaningless to allocate the quantity of pieces of detection information which is greater than the quantity of pieces of detection information allowed by the resources in the CORESET.

In a case that the initial quantity of pieces of detection information about some search spaces is smaller than its corresponding excessive quantity to be deducted, the quantity of pieces of detection information about these search spaces in the excessive quantity that have not been processed may be allocated to the other search spaces. To be specific, the implementation mode may include: acquiring a third quantity of pieces of detection information about a first search space; and in a case that the third quantity is greater than zero, allocating the third quantity of pieces of detection information to a search space other than the first search space, and acquiring the first quantity of pieces of detection information about each search space. The initial quantity of pieces of detection information about the first search space may be smaller than a product of the second quantity of pieces of detection information and an allocation weight value corresponding to the first search space, and the third quantity may be acquired through a formula the third quantity=$[(\Sigma_i B_i - M) \times P_i] - B_i + C$, where $B_i$ represents the initial quantity of pieces of detection information about the $i^{th}$ search space, $P_i$ represents the allocation weight value of the $i^{th}$ search space, and M represents the total quantity of pieces of detection information supported by the UE.

It should be appreciated that, during the allocation of the third quantity to the search space other than the first search space, the third quantity may be allocated to a search space in the search spaces other than the first search space in accordance with the above-mentioned allocation weight value of the search space, or the third quantity may be allocated to a search space having sufficient remaining quantity of pieces of detection information in the search spaces other than the first search space. A specific allocation mode will not be particularly defined herein, as long as a sum of the quantities of pieces of detection information about the search spaces overlapping each other does not exceed the total quantity of pieces of detection information after the allocation of the third quantity has been completed.

Taking the determination of the quantity of blind detection operations as an example, in a case that the initial quantity of blind detection operations for a certain search space is smaller than the excessive quantity corresponding thereto, the quantity of blind detection operations for the search space may be reduced to C (C is an integer greater than or equal to 0). A sum of a difference between the excessive quantity and the initial quantity of blind detection operations and C is an overdraft quantity, and the overdraft quantity may be re-allocated to the other search space in accordance with the allocation weight value.

Taking the determination of the quantity of blind detection operations as an example, the quantity of blind detection operations is 40, and a minimum quantity of blind detection operations for each search space is 13 (i.e., C=3). The initial quantity of blind detection operations for a search space M1 is 20, the initial quantity of blind detection operations for a search space M2 is 15, and the initial quantity of blind detection operations for a search space M3 is 13. After the allocation in accordance with the allocation weight value, the quantity of blind detection operations for the search space M1 may be 17, the quantity of blind detection operations for the search space M2 may be 13, and the quantity of blind detection operations for the search space M3 may be 13. At this time, there are still three excessive blind detection operations. Because the quantity of blind detection operations for each of the search space M2 and the search space M3 has reached the minimum quantity of blind detection operations, at this time the three excessive blind detection operations may be allocated to the search space M1, i.e., the quantity of blind detection operations for the search space M1 may be 14.

The implementation mode will be illustratively described hereinafter in a case that the predetermined configuration parameter includes the detection periodicity of the search space and the quantity of blind detection operations for the UE is to be determined.

It is presumed that, the maximum quantity of blind detection operations supported by the UE is M=44, and a plurality of search spaces has been configured for the UE. For example, a detection periodicity of a search space S1 is 2, a detection periodicity of a search space S2 is 5, a detection periodicity of a search space S3 is 10, and the initial quantity of blind detection operations for each search space is configured as 20. In a case that the three search spaces overlaps in time, an actual quantity of blind detection operations for each search space may be calculated. At first, the excessive quantity may be calculated as 16. Next, the allocation weight value of each search space may be calculated. An allocation weight value of S1 may be ⅝, an allocation weight value of S2 may be ¼, and an allocation weight value of S3 may be ⅛. Then, the actually allocated quantity of blind detection operations for each search space may be calculated. An actually allocated quantity of blind detection operations for S1 may be 10, an actually allocated quantity of blind detection operations for S2 may be 16, and an actually allocated quantity of blind detection operations for S3 may be 18.

Based on the allocation mode in the embodiments of the present disclosure, the total quantity of blind detection operations may not exceed 44. In addition, a large quantity of blind detection operations may be reserved for the search space with a long periodicity and a large quantity of blind detection operations may be discarded for the search space with a short periodicity, so it is able to ensure the equity, and therefore prevent the quantity of blind detection operations from being not allocated for the search space with the long periodicity for a long term.

Third mode: determining the first quantity of pieces of detection information about each search space in accordance with the total quantity of pieces of detection information supported by the UE.

It should be appreciated that, this mode may refer to the reallocation of the total quantity of pieces of detection information in accordance with a ratio of each search space. To be specific, an allocation weight value of each search space may be determined in accordance with a predetermined configuration parameter, the allocation ratio of each search space may be determined in accordance with the allocation weight value, and then the first quantity of pieces of detection information about each search space may be determined in accordance with the allocation ratio and the total quantity of pieces of detection information supported by the UE.

To be specific, the predetermined configuration parameter may include at least one of a detection periodicity of the search space, the initial quantity of pieces of detection information, a priority level of the search space, a DCI format, a DCI length and a search space type.

Depending on different predetermined configuration parameters, modes for determining the allocation weight value of each search space in accordance with the predetermined configuration parameter may be different from each other. The determining the allocation weight value of each search space in accordance with the predetermined configuration parameter will be described hereinafter with respect to different predetermined configuration parameters.

C1: in a case that the predetermined configuration parameter includes the detection periodicity of the search space, or includes the detection periodicity of the search space and the initial quantity of pieces of detection information, the determining the allocation weight value of each search space in accordance with the predetermined configuration parameter may include: acquiring a search frequency for each search space within a predetermined time period in accordance with the predetermined configuration parameter; and acquiring the allocation weight value of each search space in accordance with the search frequency.

To be specific, the predetermined time period may refer to unit time.

Further, the acquiring the search frequency for each search space within the predetermined time period may include acquiring the search frequency for each search space within the predetermined time period through a formula $$F_i = \frac{1}{T_i},$$

where $F_i$ represents a search frequency for an $i^{th}$ search space within the predetermined time period, $T_i$ represents a detection periodicity of the $i^{th}$ search space, and i represents an index of the search space.

In this case, depending on different predetermined configuration parameters, the modes of acquiring the allocation weight value of each search space in accordance with the search frequency may be different from each other too. The acquiring the allocation weight value of each search space in accordance with the search frequency will be described hereinafter with respect to different predetermined configuration parameters.

D1: in a case that the predetermined configuration parameter merely includes the detection periodicity of the search space, the acquiring the allocation weight value of each search space in accordance with the search frequency may include acquiring the allocation weight value of each search space through a formula $$P_i = \frac{F_i}{\Sigma_i F_i},$$

where $P_i$ represents an allocation weight value of the $i^{th}$ search space, $F_i$ represents the search frequency for the $i^{th}$ search space within the predetermined time period, and $\Sigma$ represents a summation function.

D2: in a case that the predetermined configuration parameter includes the detection periodicity of the search space and the initial quantity of pieces of detection information, the acquiring the allocation weight value of each search pace in accordance with the search frequency may include acquiring the allocation weight value of each search space through a formula $$P_i = \frac{B_i \times F_i}{\Sigma_i B_i \times F_i},$$

where $P_i$ represents the allocation weight value of the $i^{th}$ search space, $F_i$ represents the search frequency of the $i^{th}$ search space within the predetermined time period, and $B_i$ represents the initial quantity of pieces of detection information about the $i^{th}$ search space.

C2: in a case that the predetermined configuration parameter includes the priority level of the search space, the determining the allocation weight value of each search space in accordance with the predetermined configuration parameter may include acquiring the allocation weight value of each search space through a formula $$P_i = \frac{L_i}{\Sigma_i L_i},$$

where $P_i$ represents the allocation weight value of the $i^{th}$ search space, and $L_i$ represents a priority level of the $i^{th}$ search space.

Further, the determining the allocation ratio of each search space in accordance with the allocation weight value may include acquiring the allocation ratio of each search space through a formula $$U_i = \frac{1}{P_i},$$

where $U_i$ represents an allocation ratio of the $i^{th}$ search space, and $P_i$ represents the allocation weight value of the $i^{th}$ search space.

It should be appreciated that, the allocation weight value of each search space may be calculated through a formula $$P_i = \frac{L_i^a \times B_i^b \times F_i^c}{\Sigma_i L_i^a \times B_i^b \times F_i^c}.$$

The above situation may be considered as a special case where a, b and c in the formula are each of 0 or 1.

Through assigning each of a, b and c with different values, the scheme in the embodiments of the present disclosure may be further applied to various application scenarios.

Further, the determining the first quantity of pieces of detection information about each search space in accordance with the allocation ratio and the total quantity of pieces of detection information supported by the UE may include acquiring the first quantity of pieces of detection information about each search space through a formula $$B'_i = \left\lfloor \frac{U_i}{\sum_i U_i} \times M \right\rfloor,$$

where $B'_i$ represents the first quantity of pieces of detection information about the $i^{th}$ search space, $U_i$ represents the allocation ratio of the $i^{th}$ search space, and M represents the total quantity of pieces of detection information supported by the UE.

It should be appreciated that, the above description in the embodiments of the present disclosure may refer to the modes for re-determining the quantity of pieces of detection information about each search space in a case that at least two search spaces are being detected by the UE and the sum of the initial quantities of pieces of detection information about the at least two search spaces is greater than the total quantity of pieces of detection information supported by the UE. In a case that the UE merely needs to detect one search space in any unit time, or in a case that there is a plurality of search spaces but the sum of the initial quantities of pieces of detection information about all of the search spaces is not greater than the total quantity of pieces of detection information supported by the UE, the UE may detect each search space respectively in accordance with the initial quantity of pieces of detection information configured by the network. In the embodiments of the present disclosure, it is able to support overbooking the allocation of the quantity of blind detection operations and the quantity of channel estimates for the search spaces with different periodicities, i.e., the quantity of blind detection operations that does not exceed the maximum quantity of blind detection operations supported by the UE and the quantity of channel estimates that does not exceed the maximum quantity of channel estimated supported by the UE may be allocated individually for each search space, so as to make full use of a processing capability of the UE, improve a system resource utilization rate and reduce a probability of the allocation blocking. In a case that a plurality of search spaces overlaps each other in time, the quantity of blind detection operations or the quantity of channel estimates may be allocated for the search spaces using the method in the embodiments of the present disclosure, so as to ensure that a sum of the total quantity of blind detection operations or the total quantity of channel estimates for all the search spaces does not exceed a maximum support capability of the UE.

It should be further appreciated that, the method in the embodiments of the present disclosure may also be applied to any other situation where limited resources are to be allocated in an excessive manner between resources with different periodicities, e.g., the power allocation in a case that a periodical signal is transmitted on a plurality of carriers simultaneously.

Figure 2:
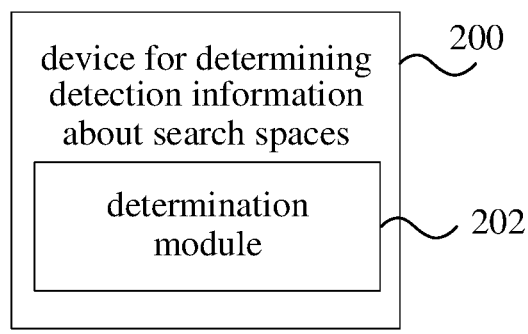
FIG. 2 is a schematic view showing a device for determining detection information about search spaces according to an embodiment of the present disclosure.

As shown in FIG. 2, the present disclosure further provides in an embodiment a device 200 for determining detection information about search spaces, which includes a determination module 201 used to, in a case that at least two search spaces are being detected by a UE and a sum of initial quantities of pieces of detection information about the at least two search spaces is greater than a total quantity of pieces of detection information supported by the UE, determine a first quantity of pieces of detection information about each of the at least two search spaces. A sum of the first quantities of pieces of detection information about the at least two search spaces is smaller than or equal to the total quantity of pieces of detection information. The detection information includes PDCCH candidates or PDCCH channel estimates.

Further, the determination module 201 may include at least one of: a first determination sub-module used to determine the first quantity of pieces of detection information about each search space in accordance with information about a type of a priority level of the search space; a second determination sub-module used to determine the first quantity of pieces of detection information about each search space in accordance with a second quantity of pieces of detection information, the second quantity of pieces of detection information being a difference between the sum of the initial quantities of pieces of detection information about the at least two search spaces and the total quantity of pieces of detection information supported by the UE; and a third determination sub-module used to determine the first quantity of pieces of detection information about each search space in accordance with the total quantity of pieces of detection information supported by the UE.

Further, the second determination sub-module may include: a first determination unit used to determine an allocation weight value of each search space in accordance with a predetermined configuration parameter; and a first acquisition unit used to acquire the first quantity of pieces of detection information about each search space in accordance with the second quantity of pieces of detection information and the allocation weight value.

Further, the third determination sub-module may include: a second determination unit used to determine an allocation weight value about each search space in accordance with a predetermined configuration parameter; a third determination unit used to determine an allocation ratio of each search space in accordance with the allocation weight value; and a fourth determination unit used to determine the first quantity of pieces of detection information about each search space in accordance with the allocation ratio and the total quantity of pieces of detection information supported by the UE.

To be specific, the predetermined configuration parameter may include at least one of a detection periodicity of the search space, the initial quantity of pieces of detection information, a priority level of the search space, a DCI format, a DCI length and a search space type.

Further, the determining the allocation weight value of each search space in accordance with the predetermined configuration parameter may include: acquiring a search frequency for each search space within a predetermined time period in accordance with the predetermined configuration parameter; and acquiring the allocation weight value of each search space in accordance with the search frequency.

Further, in a case that the predetermined configuration parameter includes the detection periodicity of the search space, the acquiring the search frequency for each search space within the predetermined time period may include acquiring the search frequency for each search space within the predetermined time period through a formula $$F_i = \frac{1}{T_i},$$

and the acquiring the allocation weight value of each search space in accordance with the search frequency may include acquiring the allocation weight value of each search space through a formula $$P_i = \frac{F_i}{\Sigma_i F_i},$$

where $F_i$ represents a search frequency for an $i^{th}$ search space within the predetermined time period, Ti represents a detection periodicity of the $i^{th}$ search space, $P_i$ represents an allocation weight value of the $i^{th}$ search space, $\Sigma$ represents a summation function, and i represents an index of the search space.

Further, in a case that the predetermined configuration parameter includes the detection periodicity of the search space and the initial quantity of pieces of detection information, the acquiring the search frequency for each search space within the predetermined time period may include acquiring the search frequency for each search space within the predetermined time period through a formula $$F_i = \frac{1}{T_i},$$

and the acquiring the allocation weight value of each search space in accordance with the search frequency may include acquiring the allocation weight value of each search space through a formula $$P_i = \frac{B_i \times F_i}{\Sigma_i B_i \times F_i},$$

$F_i$ represents a search frequency for an $i^{th}$ search space within the predetermined time period, Ti represents a detection periodicity of the $i^{th}$ search space, $P_i$ represents an allocation weight value of the $i^{th}$ search space, $B_i$ represents the initial quantity of pieces of detection information about the $i^{th}$ search space, represents a summation function, and i represents an index of the search space.

Further, in a case that the predetermined configuration parameter includes the priority level of the search space, the determining the allocation weight value of each search space in accordance with the predetermined configuration parameter may include acquiring the allocation weight value of each search space through a formula $$P_i = \frac{L_i}{\Sigma_i L_i},$$

where $P_i$ represents the allocation weight value of the $i^{th}$ search space, $L_i$ represents a priority level of the $i^{th}$ search space, $\Sigma$ represents a summation function, and i represents an index of the search space.

Further, the first acquisition unit is further used to acquire the first quantity of pieces of detection information about each search space through a formula $B'_i = \max\{C, B_i - \lceil(\Sigma_i B_i - M) \times P_i\rceil\}$, where $B'_i$ represents the first quantity of pieces of detection information about the $i^{th}$ search space, $B'_i$ represents the initial quantity of pieces of detection information about the $i^{th}$ search space, $P_i$ represents the allocation weight value of the $i^{th}$ search space, M represents the total quantity of pieces of detection information supported by the UE, $\Sigma_i B_i - M$ represents the second quantity of pieces of detection information which is greater than the total quantity of pieces of detection information supported by the UE, $\Sigma$ represents a summation function, C represents a first threshold, and i represents an index of the search space.

The second determination sub-module may further include: a second acquisition unit used to acquire a third quantity of pieces of detection information about a first search space; and an allocation unit used to, in a case that the third quantity is greater than zero, allocate the third quantity to a search space other than the first search space, and acquire the first quantity of pieces of detection information about each search space. An initial quantity of pieces of detection information about the first search space may be smaller than a product of the second quantity of pieces of detection information and an allocation weight value corresponding to the first search space, and the third quantity may be acquired through a formula the third quantity=$\lceil(\Sigma_i B_i - M) \times P_i\rceil - B_i + C$, where $B_i$ represents the initial quantity of pieces of detection information about the $i^{th}$ search space, $P_i$ represents the allocation weight value of the $i^{th}$ search space, M represents the total quantity of pieces of detection information supported by the UE, C represents a first threshold, and i represents an index of the search space.

The third determination unit is further used to acquire the allocation ratio of each search space through a formula $$U_i = \frac{1}{P_i},$$

where $U_i$ represents an allocation ratio of the $i^{th}$ search space, $P_i$ represents an allocation weight value of the $i^{th}$ search space, and i represents an index of the search space.

The fourth determination unit is further used to acquire the first quantity of pieces of detection information about each search space through a formula $$B'_i = \left\lfloor \frac{U_i}{\Sigma_i U_i} \times M \right\rfloor,$$

where $B'_i$ represents the first quantity of pieces of detection information about the $i^{th}$ search space, $U_i$ represents the allocation ratio of the $i^{th}$ search space, M represents the total quantity of pieces of detection information supported by the UE, $\Sigma$ represents a summation function, and i represents an index of the search space.

The in the embodiments of the present disclosure is capable of implementing the procedures of the method implemented by the device 200 for determining the detection information about the search spaces in FIG. 1, which will not be particularly defined herein. According to the device 200 for determining the detection information about the search spaces in the embodiments of the present disclosure, in a case that at least two search spaces are being detected by the UE and the sum of the initial quantities of pieces of detection information about the at least two search spaces is greater than the total quantity of pieces of detection information supported by the UE, the first quantity of pieces of detection information about each of the at least two search spaces may be determined, and the sum of the first quantities of pieces of detection information about the at least two search spaces may be ensured to be smaller than or equal to the total quantity of pieces of detection information. As a result, it is able to improve a control resource utilization rate of a system and reduce a probability of the blocking of control channel allocation, thereby to ensure the reliability of network communication.

Figure 3:
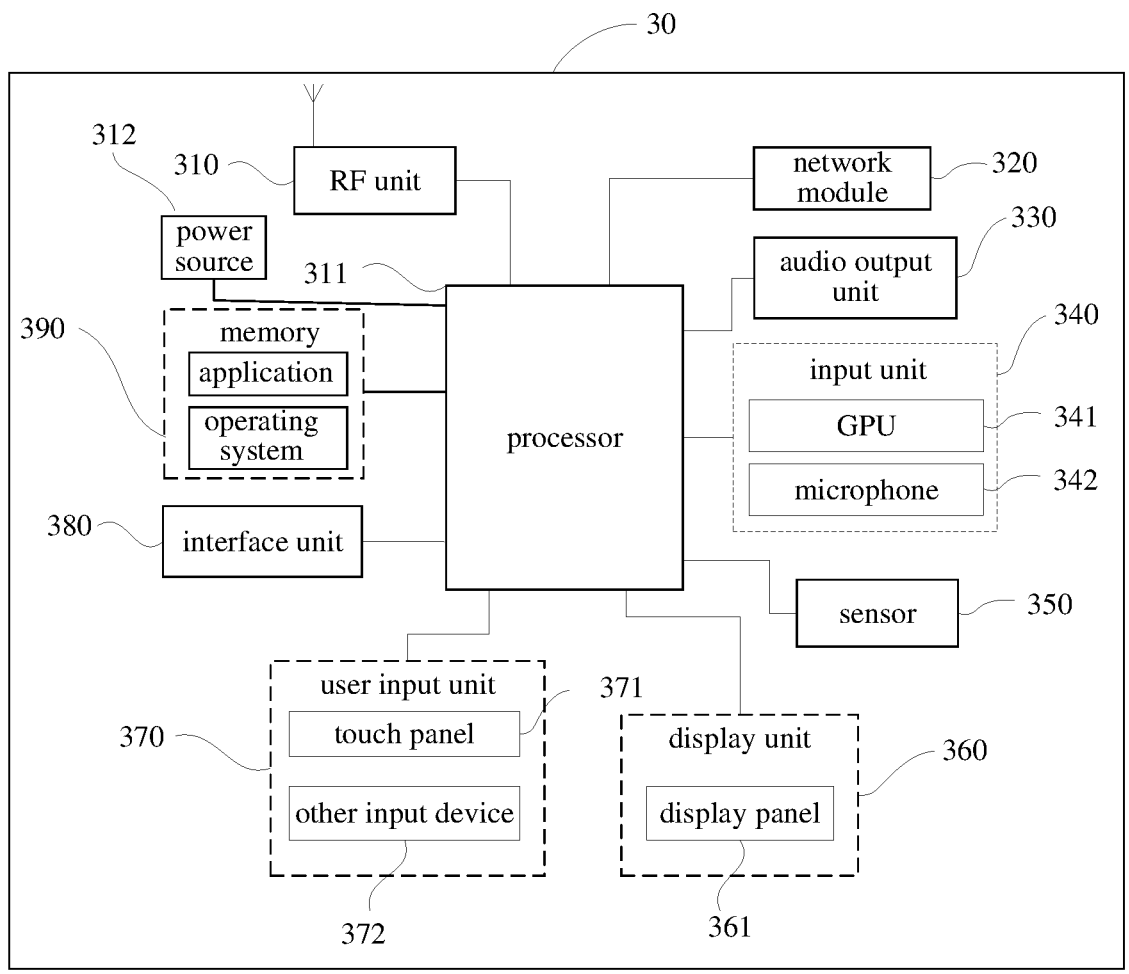
FIG. 3 is a block diagram of the device for determining detection information about search spaces according to an embodiment of the present disclosure.

FIG. 3 shows a hardware structure of a device for determining detection information about search spaces.

The device 30 for determining detection information about search spaces may include, but not limited to, a Radio Frequency (RF) unit 310, a network module 320, an audio output unit 330, an input unit 340, a sensor 350, a display unit 360, a user input unit 370, an interface unit 380, a memory 390, a processor 311, and a power source 312. It should be appreciated that, the structure of the device for determining the detection information about the search spaces in FIG. 3 shall not be construed as limiting the device for determining the detection information about the search spaces. The device may include more or fewer members, or some members may be combined, or the members may be arranged in different modes. In the embodiments of the present disclosure, the device or determining detection information about search spaces may include, but not limited to, mobile phone, flat-panel computer, notebook computer, palm computer, vehicle-mounted terminal, wearable device or pedometer.

The processor 311 is used to, in a case that at least two search spaces are being detected by a UE and a sum of initial quantities of pieces of detection information about the at least two search spaces is greater than a total quantity of pieces of detection information supported by the UE, determine a first quantity of pieces of detection information about each of the at least two search spaces. A sum of the first quantities of pieces of detection information about the at least two search spaces is smaller than or equal to the total quantity of pieces of detection information. The detection information includes PDCCH candidates or PDCCH channel estimates.

According to the device for determining the detection information about the search spaces in the embodiments of the present disclosure, in a case that at least two search spaces are being detected by the UE and the sum of the initial quantities of pieces of detection information about the at least two search spaces is greater than the total quantity of pieces of detection information supported by the UE, the first quantity of pieces of detection information about each of the at least two search spaces may be determined, and the sum of the first quantities of pieces of detection information about the at least two search spaces may be ensured to be smaller than or equal to the total quantity of pieces of detection information. As a result, it is able to improve a control resource utilization rate of a system and reduce a probability of the blocking of control channel allocation, thereby to ensure the reliability of network communication.

It should be further appreciated that, in the embodiments of the present disclosure, the radio frequency unit 310 is used to transmit and receive information, or transmit and receive signals during the phone call. To be specific, the radio frequency unit 310 may, upon the receipt of downlink data from a network device, transmit the downlink data to the processor 311 for subsequent treatment. In addition, the radio frequency unit 310 may transmit uplink data to the network device. Usually, the radio frequency unit 310 may include, but not limited to, an antenna, at least one amplifier, a transceiver, a coupler, a low-noise amplifier and a duplexer. In addition, the radio frequency unit 310 may also communicate with a network and the other devices via a wireless communication system.

The network module 320 of the device for determining the detection information about the search spaces is used to enable a user to access the broadband Internet in a wireless manner, e.g., help the user to receive and send an e-mail, browse a web or access a streaming media.

The audio output unit 330 is used to convert audio data received by the radio frequency unit 310 or the network module 320, or audio data stored in the memory 390, into an audio signal and output the audio signal as a sound. In addition, the audio output unit 330 is further used to provide an audio output related to a specific function executed by the device 30 for determining the detection information about the search spaces (e.g., a sound occurring when a calling signal or a message has been received). The audio output unit 330 may include a loudspeaker, a buzzer, a receiver, and the like.

The input unit 340 is used to receive an audio or video signal. The input unit 340 may include a Graphics Processing Unit (GPU) 341 and a microphone 342. The GPU 341 is used to process image data of a static image or video acquired by an image collection unit (e.g., a camera) in a video capturing mode or an image capturing mode, and a processed image frame may be displayed by the display unit 360. The image frame processed by the GPU 341 may be stored in the memory 390 (or another storage medium) or transmitted via the radio frequency unit 310 or network module 320. The microphone 342 is used to receive a sound, and convert the sound into voice data. In a call mode, the processed audio data may be converted into data in a format capable of being transmitted by the radio frequency unit 310 to a mobile communication network device, and then be outputted.

The device for determining the detection information about the search spaces further includes at least one sensor 350, e.g., a light sensor, a movement sensor and the other sensors. To be specific, the light sensor may include an ambient light sensor or a proximity sensor. The ambient light sensor is used to adjust a brightness value of a display panel 361 in accordance with ambient light. The proximity sensor is used to turn off the display panel 361 and/or a backlight source in a case that the device 30 for determining the detection information about the search spaces is near the ear of the user. As one of the movement sensors, an accelerometer may detect acceleration in various directions (usually a three-axis accelerometer), and detect a level and a direction of a gravity force in a case of being in a static state. Through the accelerometer, it is able to identify a posture of the device for determining the detection information about the search spaces (e.g., perform a switching operation between portrait and landscape orientations, play relevant games, and calibrate a posture of a magnetometer), and perform vibration-recognition-related functions (e.g., count steps and strikes). The sensor 350 may further include a fingerprint sensor, a pressure sensor, an iris sensor, a molecule sensor, a gyroscope, a barometer, a hygrometer, a thermometer or an infrared sensor, which will not be particularly defined herein.

The display unit 360 is used to display information inputted by the user or provided to the user. The display unit 360 may include the display panel 361, e.g., a Liquid Crystal Display (LCD) panel, or an Organic Light-Emitting Diode (OLED) panel.

The user input unit 370 is used to receive digital or character information inputted by the user, and generate a key signal input related to user settings and function control of the device for determining the detection information about the search spaces. To be specific, the user input unit 370 may include a touch panel 371 and another input device 372. The touch panel 371, also called as touch screen, is used to collect a touch operation made by the user on or in proximity to the touch panel (e.g., an operation made by the user through any appropriate object or attachment (e.g., finger or stylus) on or in the proximity to the touch panel 371). The touch panel 371 may include a touch detection device and a touch controller. The touch detection device is used to detect a touch position of the user and a signal generated due to the touch operation, and transmit the signal to the touch controller. The touch controller is used to receive touch information from the touch detection device, convert it into coordinates of a touch point, transmit the coordinates to the processor 311, and receive and execute a command from the processor 311. In addition, the touch panel 371 may be of a resistive type, a capacitive type, an infrared type or a surface acoustic wave type. The other input device 372 may include, but not limited to, a physical keyboard, a functional button (e.g., a volume control button or an on/off button), a trackball, a mouse, and a joystick, which will not be particularly defined herein.

Further, the touch panel 371 may cover the display panel 361. In a case that the touch operation made on or in proximity to the touch panel 371 has been detected, the touch panel 371 may transmit the touch information to the processor 311, so as to determine a type of a touch event. Then, the processor 311 may control the display panel 361 to provide a corresponding visual output thereon in accordance with the type of the touch event. Although the touch panel 371 and the display panel 361 are configured as two separate members for implementing the input and output functions of the device for determining the detection information about the search spaces in FIG. 3, in some embodiments of the present disclosure, they may be integrated so as to achieve the input and output functions of the device for determining the detection information about the search spaces, which will not be particularly defined herein.

The interface unit 380 is used to provide an interface between an external device and the device 30 for determining the detection information about the search spaces. For example, the external device may include a wired or wireless headset port, an external power source port (or a charging port), a wired or wireless data port, a memory card port, a port for connecting a device having an identification module, an audio Input/Output (I/O) port, a video I/O port, and an earphone port. The interface unit 380 is used to receive an input from the external device (e.g., data information and electricity) and transmit the input to one or more elements of the device 30 for determining the detection information about the search spaces, or transmit data between the device 30 for determining the detection information about the search spaces and the external device.

The memory 390 is used to store therein a software application and various data. It may mainly include an application storage area and a data storage area. An operating system and at least one application for the functions (e.g., an audio/image playing function) may be stored in the application storage area. Data created in accordance with the operation of the mobile phone (e.g., audio data and phone book) may be stored in the data storage area. In addition, the memory 390 may include a high-speed random access memory, or a non-volatile memory (e.g., at least one magnetic disk or flash memory), or any other volatile solid state memory.

As a control center of the device for determining the detection information about the search spaces, the processor 311 may be connected to various other members of the device for determining the detection information about the search spaces via various interfaces and circuits, and used to run or execute the software program and/or module stored in the memory 390, and call the data stored in the memory 390, so as to execute the functions of the device for determining the detection information about the search spaces and process the data, thereby to monitor the entire device. The processor 311 may include one or more processing units. Preferably, an application processor and a modem may be integrated into the processor 311. The application processor is mainly used to process the operating system, a user interface and the application. The modem is mainly used to process wireless communication. It should be appreciated that, the modem may also not be integrated into the processor 311.

The device 30 for determining the detection information about the search spaces may further includes a power source 312 (e.g., a battery), which is used to supply power to the members of the device 30. Preferably, the power source 312 is logically connected to the processor 311 via a power source management system, so as to achieve such functions as charging, discharging and power consumption management through the power source management system.

In addition, the device 30 for determining the detection information about the search spaces may include some functional modules not shown in FIG. 3, which will not be particularly defined herein.

Figure 4:
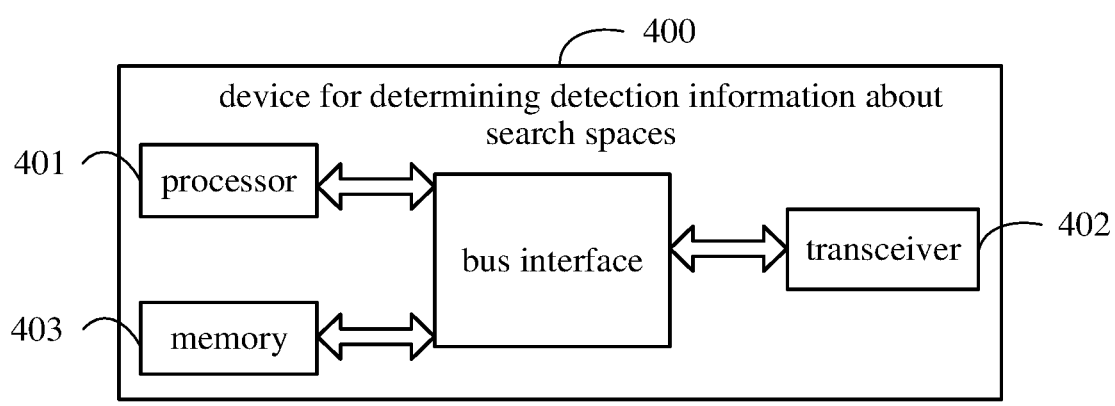
FIG. 4 is another block diagram of the device for determining detection information about search spaces according to an embodiment of the present disclosure.

FIG. 4 also shows a hardware structure of a device for determining detection information about search spaces according to an embodiment of the present disclosure, and the device is capable of implementing the above-mentioned method for determining the detection information about the search spaces with a same technical effect. As shown in FIG. 4, the device 400 for determining the detection information about the search spaces may include a processor 401, a transceiver 402, a memory 403 and a bus interface.

The processor 401 is used to read a program stored in the memory 403, so as to, in a case that at least two search spaces are being detected by a UE and a sum of initial quantities of pieces of detection information about the at least two search spaces is greater than a total quantity of pieces of detection information supported by the UE, determine a first quantity of pieces of detection information about each of the at least two search spaces. A sum of the first quantities of pieces of detection information about the at least two search spaces is smaller than or equal to the total quantity of pieces of detection information. The detection information includes PDCCH candidates or PDCCH channel estimates.

In FIG. 4, bus architecture may include a number of buses and bridges connected to each other, so as to connect various circuits for one or more processors such as the processor 401 and one or more memories such as the memory 403. In addition, as is known in the art, the bus architecture may be used to connect various other circuits, such as a circuit for a peripheral device, a circuit for a voltage stabilizer and a power management circuit, which are not further explained herein. The bus interface may be provided, and the transceiver 402 may consist of a plurality of elements, i.e., a transmitter and a receiver for communication with various other devices over a transmission medium. The processor 401 may take charge of managing the bus architecture as well as general processings. The memory 403 may store therein data for the operation of the processor 401.

In a possible embodiment of the present disclosure, the processor 401 is further used to read the program stored in the memory 403, so as to perform at least one of: determining the first quantity of pieces of detection information about each search space in accordance with information about a type of a priority level of the search space; determining the first quantity of pieces of detection information about each search space in accordance with a second quantity of pieces of detection information, the second quantity of pieces of detection information being a difference between the sum of the initial quantities of pieces of detection information about the at least two search spaces and the total quantity of pieces of detection information supported by the UE; and determining the first quantity of pieces of detection information about each search space in accordance with the total quantity of pieces of detection information supported by the UE.

In a possible embodiment of the present disclosure, the processor 401 is further used to read the program stored in the memory 403, so as to: determine an allocation weight value of each search space in accordance with a predetermined configuration parameter; and acquire the first quantity of pieces of detection information about each search space in accordance with the second quantity of pieces of detection information and the allocation weight value.

In a possible embodiment of the present disclosure, the processor 401 is further used to read the program stored in the memory 403, so as to: determine an allocation weight value about each search space in accordance with a predetermined configuration parameter; determine an allocation ratio of each search space in accordance with the allocation weight value; and determine the first quantity of pieces of detection information about each search space in accordance with the allocation ratio and the total quantity of pieces of detection information supported by the UE.

To be specific, the predetermined configuration parameter may include at least one of a detection periodicity of the search space, the initial quantity of pieces of detection information, a priority level of the search space, a DCI format, a DCI length and a search space type.

In a possible embodiment of the present disclosure, the processor 401 is further used to read the program stored in the memory 403, so as to: acquire a search frequency for each search space within a predetermined time period in accordance with the predetermined configuration parameter; and acquire the allocation weight value of each search space in accordance with the search frequency.

In a possible embodiment of the present disclosure, in a case that the predetermined configuration parameter includes the detection periodicity of the search space, the processor 401 is further used to read the program stored in the memory 403, so as to acquire the search frequency for each search space within the predetermined time period through a formula $$F_i = \frac{1}{T_i},$$

and the acquiring the allocation weight value of each search space in accordance with the search frequency may include acquiring the allocation weight value of each search space through a formula $$P_i = \frac{F_i}{\Sigma_i F_i},$$

where $F_i$ represents a search frequency for an $i^{th}$ search space within the predetermined time period, Ti represents a detection periodicity of the $i^{th}$ search space, $P_i$ represents an allocation weight value of the $i^{th}$ search space, $\Sigma$ represents a summation function, and i represents an index of the search space.

In a possible embodiment of the present disclosure, in a case that the predetermined configuration parameter includes the detection periodicity of the search space and the initial quantity of pieces of detection information, the processor 401 is further used to read the program stored in the memory 403, so as to acquire the search frequency for each search space within the predetermined time period through a formula $$F_i = \frac{1}{T_i},$$

and the acquiring the allocation weight value of each search space in accordance with the search frequency may include acquiring the allocation weight value of each search space through a formula $$P_i = \frac{B_i \times F_i}{\Sigma_i B_i \times F_i},$$

where $F_i$ represents a search frequency for an $i^{th}$ search space within the predetermined time period, Ti represents a detection periodicity of the $i^{th}$ search space, $P_i$ represents an allocation weight value of the $i^{th}$ search space, $B_i$ represents the initial quantity of pieces of detection information about the $i^{th}$ search space, $\Sigma$ represents a summation function, and i represents an index of the search space.

In a possible embodiment of the present disclosure, in a case that the predetermined configuration parameter includes the priority level of the search space, the processor 401 is further used to read the program stored in the memory 403, so as to acquire the allocation weight value of each search space through a formula $$P_i = \frac{L_i}{\Sigma_i L_i},$$

where $P_i$ represents the allocation weight value of the $i^{th}$ search space, $L_i$ represents a priority level of the $i^{th}$ search space, $\Sigma$ represents a summation function, and i represents an index of the search space.

In a possible embodiment of the present disclosure, the processor 401 is further used to read the program stored in the memory 403, so as to acquire the first quantity of pieces of detection information about each search space through a formula $B'_i = \max\{C, B_i - \lceil(\Sigma_i B_i - M) \times P_i\rceil\}$, where $B'_i$ represents the first quantity of pieces of detection information about the $i^{th}$ search space, $B_i$ represents the initial quantity of pieces of detection information about the $i^{th}$ search space, $P_i$ represents the allocation weight value of the $i^{th}$ search space, M represents the total quantity of pieces of detection information supported by the UE, $\Sigma_i B_i - M$ represents the second quantity of pieces of detection information which is greater than the total quantity of pieces of detection information supported by the UE, $\Sigma$ represents a summation function, C represents a first threshold, and i represents an index of the search space.

In a possible embodiment of the present disclosure, the processor 401 is further used to read the program stored in the memory 403, so as to: acquire a third quantity of pieces of detection information about a first search space; and in a case that the third quantity is greater than zero, allocate the third quantity to a search space other than the first search space, and acquire the first quantity of pieces of detection information about each search space. An initial quantity of pieces of detection information about the first search space may be smaller than a product of the second quantity of pieces of detection information and an allocation weight value corresponding to the first search space, and the third quantity may be acquired through a formula the third quantity=$[(\Sigma_i B_i - M) \times P_i] - B_i + C$, where $B_i$ represents the initial quantity of pieces of detection information about the $i^{th}$ search space, $P_i$ represents the allocation weight value of the $i^{th}$ search space, M represents the total quantity of pieces of detection information supported by the UE, C represents a first threshold, and i represents an index of the search space.

In a possible embodiment of the present disclosure, the processor 401 is further used to read the program stored in the memory 403, so as to acquire the allocation ratio of each search space through a formula $$U_i = \frac{1}{P_i},$$

where $U_i$ represents an allocation ratio of the $i^{th}$ search space, $P_i$ represents an allocation weight value of the $i^{th}$ search space, and i represents an index of the search space.

In a possible embodiment of the present disclosure, the processor 401 is further used to read the program stored in the memory 403, so as to acquire the first quantity of pieces of detection information about each search space through a formula $$B'_i = \left\lfloor \frac{U_i}{\Sigma_i U_i} \times M \right\rfloor,$$

where $B'_i$ represents the first quantity of pieces of detection information about the $i^{th}$ search space, $U_i$ represents the allocation ratio of the $i^{th}$ search space, M represents the total quantity of pieces of detection information supported by the UE, $\Sigma$ represents a summation function, and i represents an index of the search space.

In the embodiments of the present disclosure, the device for determining the detection information about the search spaces may be a Base Transceiver Station (BTS) in a Global System of Mobile Communication (GSM) system or a Code Division Multiple Access (CDMA) system, a Node B (NB) in a Wideband Code Division Multiple Access (WCDMA) system, an Evolved Node B (eNB, or eNodeB) in an LTE system, a relay or an access point, or a base station in a future 5G network, which will not be particularly defined herein.

Preferably, the present disclosure further provides in an embodiment a device for determining detection information about search spaces, which includes a processor, a memory, and a computer program stored in the memory and executed by the processor. The processor is used to execute the computer program so as to implement the above-mentioned method for determining the detection information about the search spaces with a same technical effect, which will not repeatedly defined herein.

The present disclosure further provides in an embodiment a computer-readable storage medium storing therein a computer program. The computer program is executed by a processor so as to implement the above-mentioned method for determining the detection information about the search spaces with a same technical effect, which will not be repeatedly defined herein. The computer-readable storage medium may be a Read-Only Memory (ROM), a Random Access Memory (RAM), a magnetic disk or an optical disk.

It should be appreciated that, such terms as "include" or "including" or any other variations involved in the present disclosure intend to provide non-exclusive coverage, so that a procedure, method, article or device including a series of elements may also include other elements not listed herein, or may include any inherent elements of the procedure, method, article or device. If without any further limitations, for the elements defined by such sentence as "including one . . . ", it is not excluded that the procedure, method, article or device including the elements may also include other identical elements.

Through the above-mentioned description, it may be apparent for a person skilled in the art that the present disclosure may be implemented by software as well as a necessary common hardware platform, or by hardware, and the former may be better in most cases. Based on this, the technical solutions of the present disclosure, essentially, or parts of the technical solutions of the present disclosure contributing to the prior art, may appear in the form of software products, which may be stored in a storage medium (e.g., ROM/RAM, magnetic disk or optical disk) and include instructions so as to enable a terminal device (e.g., mobile phone, computer, server, air conditioner or network device) to execute the method in the embodiments of the present disclosure.

The above are preferred embodiments of the present disclosure. It should be appreciated that a person skilled in the art may make further improvements and modifications without departing from principles of the present disclosure, and these improvements and modifications should also fall within the protection scope of the present disclosure.

What is claimed is:

1. A method for determining detection information about search spaces, comprising:
   in a case that at least two search spaces are being detected by a User Equipment (UE) and a sum of initial quantities of pieces of detection information about the at least two search spaces is greater than a total quantity of pieces of detection information supported by the UE, determining a first quantity of pieces of detection information about each of the at least two search spaces, wherein
   determining the first quantity of pieces of detection information about each search space in accordance with the total quantity of pieces of detection information supported by the UE, including:
   determining an allocation weight value about each search space in accordance with a predetermined configuration parameter;
   determining an allocation ratio of each search space in accordance with the allocation weight value; and
   determining the first quantity of pieces of detection information about each search space in accordance with the allocation ratio and the total quantity of pieces of detection information supported by the UE;

wherein:
- a sum of the first quantities of pieces of detection information about the at least two search spaces is smaller than or equal to the total quantity of pieces of detection information; and
- the detection information includes a physical downlink control channel (Physical Downlink Control Channel, PDCCH) candidate or PDCCH channel estimate.

2. The method according to claim 1, wherein the predetermined configuration parameter comprises at least one of: a detection periodicity of the search space, the initial quantity of pieces of detection information, a priority level of the search space, a Downlink Control Information (DCI) format, a DCI length and a search space type.

3. The method according to claim 1, wherein the determining the allocation weight value of each search space in accordance with the predetermined configuration parameter comprises:
- acquiring a search frequency for each search space within a predetermined time period in accordance with the predetermined configuration parameter; and
- acquiring the allocation weight value of each search space in accordance with the search frequency.

4. The method according to claim 3, wherein in a case that the predetermined configuration parameter comprises the detection periodicity of the search space, the acquiring the search frequency for each search space within the predetermined time period comprises:
- acquiring the search frequency for each search space within the predetermined time period through a formula $$F_i = \frac{1}{T_i},$$

wherein the acquiring the allocation weight value of each search space in accordance with the search frequency includes:
- acquiring the allocation weight value of each search space through a formula $$P_i = \frac{F_i}{\Sigma_i F_i},$$

where $F_i$ represents a search frequency for an $i^{th}$ search space within the predetermined time period, Ti represents a detection periodicity of the $i^{th}$ search space, $P_i$ represents an allocation weight value of the $i^{th}$ search space, $\Sigma$ represents a summation function, and i represents an index of the search space.

5. The method according to claim 3, wherein in a case that the predetermined configuration parameter comprises the detection periodicity of the search space and the initial quantity of pieces of detection information, the acquiring the search frequency for each search space within the predetermined time period comprises:
- acquiring the search frequency for each search space within the predetermined time period through a formula $$F_i = \frac{1}{T_i},$$

wherein the acquiring the allocation weight value of each search space in accordance with the search frequency includes:
- acquiring the allocation weight value of each search space through a formula $$P_i = \frac{B_i \times F_i}{\Sigma_i B_i \times F_i},$$

where $F_i$ represents a search frequency for an $i^{th}$ search space within the predetermined time period, Ti represents a detection periodicity of the $i^{th}$ search space, $P_i$ represents an allocation weight value of the $i^{th}$ search space, $B_i$ represents the initial quantity of pieces of detection information about the $i^{th}$ search space, $\Sigma$ represents a summation function, and i represents an index of the search space.

6. The method according to claim 1, wherein in a case that the predetermined configuration parameter comprises the priority level of the search space, the determining the allocation weight value of each search space in accordance with the predetermined configuration parameter comprises:
- acquiring the allocation weight value of each search space through a formula $$P_i = \frac{L_i}{\Sigma_i L_i},$$

where $P_i$ represents the allocation weight value of the $i^{th}$ search space, $L_i$ represents a priority level of the $i^{th}$ search space, $\Sigma$ represents a summation function, and i represents an index of the search space.

7. The method according to claim 1, wherein the determining the allocation ratio of each search space in accordance with the allocation weight value comprises:
- acquiring the allocation ratio of each search space through a formula $$U_i = \frac{1}{P_i},$$

where $U_i$ represents an allocation ratio of the $i^{th}$ search space, $P_i$ represents an allocation weight value of the $i^{th}$ search space, and i represents an index of the search space.

8. The method according to claim 1, wherein the determining the first quantity of pieces of detection information about each search space in accordance with the allocation ratio and the total quantity of pieces of detection information supported by the UE comprises:
- acquiring the first quantity of pieces of detection information about each search space through a formula $$B'_i = \left\lfloor \frac{U_i}{\Sigma_i U_i} \times M \right\rfloor,$$

where $B'_i$ represents the first quantity of pieces of detection information about the $i^{th}$ search space, $U_i$ represents the allocation ratio of the $i^{th}$ search space, M represents the total quantity of pieces of detection information supported by the UE, Σ represents a summation function, and i represents an index of the search space.

9. A device for determining detection information about search spaces, comprising a memory, a processor, and a computer program stored in the memory and capable of being executed by a processor, wherein the processor is used to execute the computer program to implement a method for determining the detection information about search spaces comprising:
in a case that at least two search spaces are being detected by a User Equipment (UE) and a sum of initial quantities of pieces of detection information about the at least two search spaces is greater than a total quantity of pieces of detection information supported by the UE, determining a first quantity of pieces of detection information about each of the at least two search spaces, wherein
determining the first quantity of pieces of detection information about each search space in accordance with the total quantity of pieces of detection information supported by the UE, including:
determining an allocation weight value about each search space in accordance with a predetermined configuration parameter;
determining an allocation ratio of each search space in accordance with the allocation weight value; and
determining the first quantity of pieces of detection information about each search space in accordance with the allocation ratio and the total quantity of pieces of detection information supported by the UE;
wherein:
a sum of the first quantities of pieces of detection information about the at least two search spaces is smaller than or equal to the total quantity of pieces of detection information; and
the detection information comprises a physical downlink control channel (Physical Downlink Control Channel, PDCCH) candidate or PDCCH channel estimate.

10. The device according to claim 9, wherein the predetermined configuration parameter comprises at least one of: a detection periodicity of the search space, the initial quantity of pieces of detection information, a priority level of the search space, a Downlink Control Information (DCI) format, a DCI length and a search space type.

11. The device according to claim 9, wherein the determining the allocation weight value of each search space in accordance with the predetermined configuration parameter comprises:
acquiring a search frequency for each search space within a predetermined time period in accordance with the predetermined configuration parameter; and
acquiring the allocation weight value of each search space in accordance with the search frequency.

12. The device according to claim 11, wherein in a case that the predetermined configuration parameter comprises the detection periodicity of the search space, the acquiring the search frequency for each search space within the predetermined time period comprises:
acquiring the search frequency for each search space within the predetermined time period through a formula $$F_i = \frac{1}{T_i},$$

wherein the acquiring the allocation weight value of each search space in accordance with the search frequency includes:
acquiring the allocation weight value of each search space through a formula $$P_i = \frac{F_i}{\Sigma_i F_i},$$

where $F_i$ represents a search frequency for an $i^{th}$ search space within the predetermined time period, Ti represents a detection periodicity of the $i^{th}$ search space, $P_i$ represents an allocation weight value of the $i^{th}$ search space, Σ represents a summation function, and i represents an index of the search space.

13. The device according to claim 11, wherein in a case that the predetermined configuration parameter comprises the detection periodicity of the search space and the initial quantity of pieces of detection information, the acquiring the search frequency for each search space within the predetermined time period comprises:
acquiring the search frequency for each search space within the predetermined time period through a formula $$F_i = \frac{1}{T_i},$$

wherein the acquiring the allocation weight value of each search space in accordance with the search frequency includes:
acquiring the allocation weight value of each search space through a formula $$P_i = \frac{B_i \times F_i}{\Sigma_i B_i \times F_i},$$

where $F_i$ represents a search frequency for an $i^{th}$ search space within the predetermined time period, Ti represents a detection periodicity of the $i^{th}$ search space, $P_i$ represents an allocation weight value of the $i^{th}$ search space, $B_i$ represents the initial quantity of pieces of detection information about the $i^{th}$ search space, Σ represents a summation function, and i represents an index of the search space.

14. The device according to claim 9, wherein in a case that the predetermined configuration parameter comprises the priority level of the search space, the determining the allocation weight value of each search space in accordance with the predetermined configuration parameter comprises:
acquiring the allocation weight value of each search space through a formula $$P_i = \frac{L_i}{\Sigma_i L_i},$$

where $P_i$ represents the allocation weight value of the $i^{th}$ search space, $L_i$ represents a priority level of the $i^{th}$ search space, Σ represents a summation function, and i represents an index of the search space.

* * * * *